United States Patent
Kadlecek et al.

(10) Patent No.: US 12,037,552 B2
(45) Date of Patent: Jul. 16, 2024

(54) CO-PROCESSING OF RENEWABLE JET AND DIESEL

(71) Applicant: ExxonMobil Technology and Engineering Company, Annandale, NJ (US)

(72) Inventors: Daniel E. Kadlecek, Philadelphia, PA (US); Dominique S. Lesmanne, Jr., Brussels (BE); Sheryl B. Rubin-Pitel, Newtown, PA (US); Timothy J. Anderson, Chatham, NJ (US)

(73) Assignee: EXXONMOBIL TECHNOLOGY AND ENGINEERING COMPANY, Spring, TX (US)

(*) Notice: Subject to any disclaimer, the term of this patent is extended or adjusted under 35 U.S.C. 154(b) by 0 days.

(21) Appl. No.: 17/658,879

(22) Filed: Apr. 12, 2022

(65) Prior Publication Data

US 2022/0333023 A1 Oct. 20, 2022

Related U.S. Application Data

(60) Provisional application No. 63/175,268, filed on Apr. 15, 2021.

(51) Int. Cl.
*C10G 65/14* (2006.01)
*C10G 7/00* (2006.01)

(52) U.S. Cl.
CPC ............ *C10G 65/14* (2013.01); *C10G 7/00* (2013.01); *C10G 2300/1007* (2013.01);
(Continued)

(58) Field of Classification Search
None
See application file for complete search history.

(56) References Cited

U.S. PATENT DOCUMENTS

| 8,742,183 B2 | 6/2014 | McCall et al. |
| 8,822,744 B2 | 9/2014 | Mizan et al. |

(Continued)

FOREIGN PATENT DOCUMENTS

EP 2141217 B1 1/2010

OTHER PUBLICATIONS

International Search Report and Written Opinion mailed Jun. 29, 2022 in Application No. PCT/US2022/071685, 14pgs.

*Primary Examiner* — Tam M Nguyen
(74) *Attorney, Agent, or Firm* — Shook, Hardy & Bacon L.L.P.

(57) ABSTRACT

Systems and methods are provided for co-processing of renewable distillate fractions with mineral fractions to produce at least a jet (or kerosene) boiling range product and a diesel boiling range product. A combination of a jet boiling range product fraction and a diesel boiling range product fraction with unexpected properties can be formed by first blending i) a distillate boiling range feed fraction containing a renewable distillate component with ii) a mineral feed fraction (possibly corresponding to a whole or partial crude oil) that includes diesel boiling range compounds to form a blended composition. The blended composition can then be fractionated to form a jet boiling range product fraction and a diesel boiling range product fraction. Optionally, the resulting jet boiling range product fraction and/or diesel boiling range product fraction can be exposed to further processing, such as hydroprocessing or catalytic cracking.

13 Claims, 3 Drawing Sheets

(52) U.S. Cl.
CPC ............... *C10G 2300/1011* (2013.01); *C10G 2300/1033* (2013.01); *C10G 2300/1037* (2013.01); *C10G 2300/202* (2013.01); *C10G 2300/301* (2013.01); *C10G 2300/302* (2013.01); *C10G 2300/307* (2013.01); *C10G 2300/308* (2013.01); *C10G 2400/04* (2013.01); *C10G 2400/08* (2013.01)

(56) References Cited

U.S. PATENT DOCUMENTS

| | | | |
|---|---|---|---|
| 10,899,983 B1* | 1/2021 | Kar | C10G 31/06 |
| 2010/0025298 A1 | 2/2010 | Hommeltoft et al. | |
| 2010/0326881 A1 | 12/2010 | Lopez et al. | |
| 2012/0167451 A1* | 7/2012 | Festuccia | C10L 1/026 |
| | | | 44/307 |
| 2014/0163272 A1 | 6/2014 | Mukherjee et al. | |
| 2019/0040329 A1* | 2/2019 | Moore | C10G 69/04 |
| 2019/0093035 A1 | 3/2019 | Malatak | |
| 2021/0363449 A1* | 11/2021 | Rubin-Pitel | C10G 67/02 |
| 2022/0396534 A1* | 12/2022 | Vincent | C10L 1/08 |

* cited by examiner

CO-PROCESSING OF RENEWABLE JET AND DIESEL

CROSS REFERENCE TO RELATED APPLICATIONS

This application claims priority to and the benefit of U.S. Ser. No. 63/175,268 filed on Apr. 15, 2021, the entire contents of which are incorporated herein by reference.

FIELD

This invention relates to co-processing of renewable feedstocks with mineral feedstocks to form distillate fuel fractions including renewable components.

BACKGROUND

Typically, a petroleum-derived jet fuel has a carbon distribution ranging from approximately C8 to approximately C16, inclusive of n-paraffins, iso-paraffins, cycloparaffins and aromatics. Aromatic content is limited to a maximum 25 vol %. Any feedstock that may also provide hydrocarbons within this compositional range could theoretically be used for the production of a jet fuel. However, incorporation of bio-derived components into a potential jet fuel can require additional certification prior to use.

Due to upcoming changes in the regulatory schemes in various countries, there is likely to be an increased demand for jet fuels that include renewable fuel content. It would be desirable to develop additional systems and methods for incorporating renewable fuel content into jet fuels and/or jet fuel blending products.

Various types of hydroprocessing have been used for processing and/or co-processing of bio-derived fractions and mineral fractions. For example, U.S. Pat. No. 8,822,744 describes using hydrotreatment and optionally hydroisomerization to co-process a bio-derived fraction with a mineral feed to form a diesel boiling range fraction.

U.S. Pat. No. 8,742,183 describes forming aviation fuel from renewable feedstocks by hydrogenating and deoxygenating a renewable feedstock, followed by isomerizing at least a portion of the n-paraffins in the renewable feedstock.

European Patent EP 2141217 describes a process for manufacture of aviation fuel or fuel blending stocks of biological origin. A feed derived from renewable sources is deoxygenated and isomerized. A separation is performed to separate a heavy fraction (290° C.+) from the remainder of the effluent. The heavy fraction is then exposed again to the isomerization conditions. Separations are performed to recover jet and diesel boiling range fractions.

Coordinating Research Council report CRC-AVFL-19-2 describes characterization of physical and chemical properties for various renewable diesel fractions.

SUMMARY

In various aspects, a method for forming a jet boiling range composition and a diesel boiling range composition is provided. The method includes blending a distillate boiling range feedstock having a renewable distillate component and a mineral feedstock component to form a combined feedstock. The combined feedstock can include a weight ratio of the distillate boiling range feedstock having the renewable distillate component to a diesel boiling range portion of the mineral feedstock component of 0.01 to 5.0. The distillate boiling range feedstock having the renewable distillate component can include 10 wt % or more of components boiling at 285° C. or lower. Additionally, the method can include co-processing the combined feed to form at least a jet boiling range composition and a diesel boiling range composition. The jet boiling range composition can include a flash point of 38° C. or more, a T10 distillation point of 205° C. or less, and a final boiling point of 285° C. or less. The diesel boiling range composition can include a final boiling point of 300° C. or more and a T90 distillation point of 370° C. or less.

In various aspects, a jet boiling range composition and/or a diesel boiling range composition formed by such co-processing is also provided.

DETAILED DESCRIPTION

All numerical values within the detailed description and the claims herein are modified by "about" or "approximately" the indicated value, and take into account experimental error and variations that would be expected by a person having ordinary skill in the art.

In various aspects, systems and methods are provided for co-processing of renewable distillate fractions with mineral fractions to produce at least a jet (or kerosene) boiling range product and a diesel boiling range product. It has been discovered that a combination of a jet boiling range product fraction and a diesel boiling range product fraction with unexpected properties can be formed by first blending i) a distillate boiling range feed fraction containing a renewable distillate component with ii) a mineral feed fraction (possibly corresponding to a whole or partial crude oil) that includes diesel boiling range compounds to form a blended composition. The blended composition can then be fractionated to form a jet boiling range product fraction and a diesel boiling range product fraction. Optionally, the resulting jet boiling range product fraction and/or diesel boiling range product fraction can be exposed to further processing, such as hydroprocessing or catalytic cracking.

In some aspects, a renewable distillate fraction or component can correspond to a renewable diesel in accordance with ASTM D975 (i.e., a renewable diesel fraction that satisfies the requirements of ASTM D975). Additionally or alternately, in some aspects a renewable distillate fraction can correspond to a paraffinic diesel in accordance with EN 15940. In still other aspects, in addition to or instead of using a distillate boiling range fraction containing a renewable diesel component and/or paraffinic diesel component, other types of hydroprocessed biomass can be used for co-processing with a mineral fraction that includes diesel boiling range compounds. Examples of alternative sources for hydroprocessed biomass can include, but are not limited to, triglycerides, fatty acids or fatty acid esters, commercially processed cooking oils (including recycled and/or used cooking oils), palm oil mill effluent, Fischer-Tropsch liquids, and hydroprocessed pyrolysis oils that have been exposed to sufficient hydrotreating conditions to reduce the oxygen content of the hydroprocessed pyrolysis oil to 0.1 wt % or less. It is noted that an "off-spec" renewable diesel that does not satisfy one or more requirements of ASTM D975 is a type of hydroprocessed biomass that falls within the definition of a renewable distillate fraction or component. Similarly, an "off-spec" paraffinic diesel that does not satisfy one or more requirements of EN 15940 is a type of hydroprocessed biomass that falls within the definition of a renewable distillate fraction. In some aspects, a renewable distillate fraction or component can correspond to a renewable distillate fraction or component that contains hydroprocessed biomass but that does not contain any renewable diesel and/or any paraffinic diesel.

The unexpected combination of properties for the jet boiling range product fraction and the diesel boiling range product fraction are due in part to the fractionation used to form the product fractions. Jet fuel specifications typically include a variety of properties. Some specifications are related to boiling range, such as having a final boiling point of 300° C. or less. Conventionally, when starting with a feed corresponding to a wider boiling range feedstock, a fractionation would be performed in order to satisfy this final boiling point specification. For a conventional process producing a jet boiling range fraction, it would be desirable to retain at least some components with boiling points close to 300° C., as such heavier components can tend to have a higher energy density, thus improving the overall energy density of the resulting jet fuel.

Other specifications for a jet fuel can relate to cold flow properties of a jet fuel. For conventional mineral jet fuels, the final boiling point of 300° C. is somewhat related to the need to maintain beneficial cold flow properties, so mineral fractions with a suitable boiling range for jet fuel can roughly also correspond to mineral fractions with roughly appropriate cold flow properties for jet fuel. However, renewable distillate fractions can tend to have a relatively high paraffin content in comparison with mineral fractions, while also having a relatively low ratio of isoparaffins to n-paraffins. As a result, the cold flow properties of renewable distillate are less favorable in comparison with a mineral fraction having a similar boiling range.

In various aspects, in order to improve the cold flow properties of the jet boiling range product fraction, the fractionation of the combined feeds can be performed to produce a jet fraction with a T90 distillation point of 280° C. or less, or 275° C. or less, or 270° C. or less, such as down to having a T90 distillation point of 250° C. or possibly still lower. This is in addition to the requirement that the jet fraction has a final boiling point of 300° C. Forming a jet boiling range product with a T90 distillation point of 280° C. or less (or 275° C. or less, or 270° C. or less) can reduce or minimize the content of $C_{16}$ n-paraffins in the resulting jet boiling range fraction, and instead incorporates such $C_{16}$ n-paraffins (boiling point 287° C.) into the diesel boiling range fraction. However, $C_{16}$ isoparaffins can still be at least partially retained in the jet boiling fraction. This can have a variety of unexpected impacts on the properties of the resulting fractions.

First, it is noted that renewable distillate (and other bio-derived distillate fractions) typically includes a substantially higher content of paraffinic molecules with even numbers of carbons (e.g., $C_8$, $C_{10}$, $C_{12}$, $C_{14}$, $C_{16}$, or $C_{18}$) relative to molecules with odd numbers of carbons (such as $C_9$, $C_{11}$, $C_{13}$, $C_{15}$, or $C_{17}$). When a renewable distillate feed fraction is mixed with a mineral feed fraction, this trend of increased concentrations for even-numbered paraffins is retained, although in smaller proportion due to the more uniform distribution of carbon numbers in the mineral fraction. Due in part to this difference between paraffins containing an even number of carbons and odd number of carbons in a bio-derived fraction, and further due to the relatively low content of isoparaffins in a bio-derived fraction, the content of $C_{15}$ n-paraffins in the resulting jet boiling range product fraction will also be reduced. However, the isoparaffins present in the mineral feed fraction can result in an increased content of $C_{15}$ and $C_{16}$ isoparaffins in the resulting jet boiling range product fraction, relative to what would be expected in a product fraction solely derived from biological sources. As a result, a jet boiling range product fraction that includes substantial renewable content can be formed that has improved cold flow properties relative to a certified sustainable aviation fuel. Additionally or alternatively, the jet boiling range product fraction can have an improved specific energy relative to conventional renewable jet boiling range fraction having a similarly reduced boiling range. It is noted that such a jet boiling range product fraction is also different from conventional mineral jet boiling range fractions. The jet boiling range fraction can have a reduced energy density relative to a conventional mineral jet boiling range fraction. In some aspects, a jet boiling range product fraction can have a specific energy of 42.8 MJ/kg or more, or 43.2 MJ/kg or more, or 43.6 MJ/kg or more, or 44.0 MJ/kg or more, such as up to 45.5 MJ/kg or possibly still higher.

Still another beneficial feature of forming a jet boiling range fraction by co-processing a renewable distillate fraction and a mineral fraction that is an improved aromatics content can be achieved. A lower aromatics content, such as an aromatics content of 10 wt % or less, can reduce soot and/or smoke production during combustion. When a kerosene is used as a jet fuel, a low aromatics content, such as an aromatics content of 10 wt % or less, can also reduce or minimize flame irradiation effects in turbine engine combustors. However, it is generally desirable to have at least a few weight percent of aromatics in a jet fuel composition, as an aromatics content that is too close to 0 wt % can present difficulties. For example, the presence of aromatics assists with elastomer swell in jet fuel systems, and is also beneficial for providing a desirable density for a jet fuel. Forming a jet boiling range fraction from a renewable distillate and a mineral fraction can provide a beneficial combination for aromatics content. Aromatics content is typically close to zero in a purely renewable fraction, while mineral jet boiling range fractions can have various aromatic contents. In some aspects, by co-processing a renewable distillate fraction and a mineral fraction, a jet boiling range product fraction can be formed that includes an aromatics content of 3.0 wt % to 15 wt %, or 3.0 wt % to 10 wt %, or 5.0 wt % to 15 wt %.

Yet another beneficial feature of forming a jet boiling range product fraction by co-processing of a renewable distillate fraction and a mineral fraction can be an improved cetane index. For example, typical kerosene boiling range fuels (such as jet fuels) can typically have a cetane index of less than 30, such as between 20 and 30. Due to the low aromatics content of renewable distillate, however, a jet boiling range product fraction including renewable distillate can have a reduced aromatics content and a corresponding increase in paraffin content. This can result in an improved cetane rating. In some aspects, a jet or kerosene boiling range product fraction with a low but substantial content of aromatics (due to inclusion of renewable distillate in the feed for forming the product fraction) can have a cetane index of 25 or more, or 30 or more, or 35 or more, or 40 or more, such as up to 60 or possibly still higher. For example, a jet or kerosene range boiling range product fraction can have a cetane index of 25-60, or 25-45, or 30-45, or 35-60, or 35-45, or 45-60.

Still another potential beneficial feature for forming a jet boiling range product fraction by co-processing a renewable distillate and a mineral fraction can be reducing or minimizing the amount of hydroprocessing required for the mineral portion of the combined feed. Because renewable distillate can typically have substantially no sulfur content, if a mineral fraction has a relatively low sulfur content, it may be possible to "blend away" the sulfur in the mineral fraction sufficiently to form a jet boiling range product fraction with a sufficiently low sulfur content for use as a fuel and/or fuel blending product. Aliphatic sulfur is typically removed easily under hydrotreatment conditions, so a jet boiling range product fraction that achieves a sulfur content of 100 wppm or less due to hydrotreatment can typically have a weight ratio of aliphatic sulfur to total sulfur of less than 0.02. In other words, aliphatic sulfur corresponds to less than 2 wt % of the total sulfur. By contrast, a jet boiling range fraction with a sulfur content of 1000 wppm or less (or 500 wppm or less, or 250 wppm or less, or 100 wppm or less) that has not been exposed to hydrotreating conditions can have a weight ratio of aliphatic sulfur to total sulfur of 0.02 or more, or 0.1 or more, such as up to 0.7 or possibly still higher. It is noted that the limit for aliphatic sulfur in some jet fuel products is 30 wppm or less.

The resulting diesel boiling range fraction can also have an unexpected combination of properties. Hexadecane is the formal name for an n-paraffin including 16 carbons, but it is also commonly called "cetane". By definition, n-$C_{16}$ paraffins have a cetane number of 100. Thus, inclusion of excess $C_{16}$ n-paraffins in the resulting diesel boiling range product can be beneficial for cetane number. Additionally, because $C_{16}$ compounds are at the low end of the diesel boiling range, inclusion of additional $C_{16}$ compounds can be beneficial for cold flow properties. Additionally or alternatively, the resulting diesel boiling range fraction can have a reduced or minimized content of aromatics and/or polyaromatic hydrocarbons (PAHs). In addition or alternatively, the resulting diesel boiling range fraction can also have a higher cetane index, a lower sulfur level and/or a lower T90, T95, or final boiling point (FBP).

It is noted that not all renewable distillates have a sufficient content of components with boiling points below 285° C. to result in a significant renewable contribution to a jet fuel boiling range product. In various aspects, the renewable distillate feedstock can include 10 wt % or more of components with a boiling point below 285° C., or 20 wt % or more, such as up to 50 wt % or possibly still higher. Additionally or alternately, relative to a weight of n-paraffins in a renewable distillate, the $C_9$-$C_{15}$ n-paraffins in the renewable distillate can correspond to 10 wt % or more of the total n-paraffins in the renewable distillate, or 20 wt % or more, such as up to 50 wt % or possibly still higher.

Definitions

In this discussion, a Txx distillation point refers to the portion "xx" of a fraction can be distilled off at the corresponding temperature. Thus, a T10 distillation point of 370° C. means that 10 wt % of a sample can be distilled off at 370° C.

In this discussion, the jet boiling range or kerosene boiling range is defined as 140° C. to 300° C. A jet boiling range fraction or a kerosene boiling range fraction is defined as a fraction with a flash point of 38° C. or more (such as up to 65° C. or possibly still higher), a T10 distillation point of 205° C. or less, and a final boiling point of 300° C. or less.

In this discussion, the naphtha boiling range is defined as ~29° C. (roughly boiling point of $C_5$ compound) to 170° C. A naphtha boiling range fraction is defined as a fraction having a T10 distillation point of 29° C. or more and a T90 distillation point of 170° C. or less. It is noted that the naphtha boiling range (as well as certain other boiling ranges) overlaps with the jet boiling range. The distillate boiling range is defined as 140° C. to 566° C. A distillate boiling range fraction is defined as a fraction having a T10 distillation point of 140° C. or more and a T90 distillation point of 566° C. or less. The diesel boiling range is defined as 170° C. to 370° C. A diesel boiling range fraction is defined as a fraction having a T10 distillation point of 170° C. or more, a final boiling point of 300° C. or more, and a T90 distillation point of 370° C. or less. A vacuum gas oil boiling range fraction (also referred to as a heavy distillate) can have a T10 distillation point of 350° C. or higher and a T90 distillation point of 535° C. or less. A vacuum resid is defined as a bottoms fraction having a T10 distillation point of 500° C. or higher, or 565° C. or higher. It is noted that the definitions for distillate boiling range fraction, kerosene (or jet) boiling range fraction, diesel boiling range fraction, atmospheric resid, and vacuum resid are based on boiling point only. Thus, a distillate boiling range fraction, kerosene fraction, or diesel fraction can include components that did not pass through a distillation tower or other separation stage based on boiling point.

In this discussion, a non-hydroprocessed fraction is defined as a fraction that has not been exposed to more than 10 psia of hydrogen in the presence of a catalyst comprising a Group VI metal, a Group VIII metal, a catalyst comprising a zeolitic framework, or a combination thereof. In this discussion, a non-cracked fraction is defined as a fraction that has not been exposed to a temperature of 400° C. or more.

In this discussion, a hydroprocessed fraction refers to a hydrocarbon fraction and/or hydrocarbonaceous fraction that has been exposed to a catalyst having hydroprocessing activity in the presence of 300 kPa-a or more of hydrogen at a temperature of 200° C. or more. Examples of hydroprocessed fractions include hydroprocessed naphtha fractions (i.e., a hydroprocessed fraction having the naphtha boiling range), hydroprocessed distillate fractions (i.e., a hydroprocessed fraction having the distillate boiling range), hydroprocessed kerosene fractions (i.e., a hydroprocessed fraction having the kerosene boiling range) and hydroprocessed diesel fractions (i.e., a hydroprocessed fraction having the diesel boiling range). It is noted that a hydroprocessed fraction derived from a biological source, such as hydrotreated vegetable oil, can correspond to a hydroprocessed distillate fraction, a hydroprocessed kerosene fraction, and/or a hydroprocessed diesel fraction, depending on the boiling range of the hydroprocessed fraction. A hydroprocessed fraction can optionally be hydroprocessed prior to separation of the fraction from a crude oil or another wider boiling range fraction.

With regard to characterizing properties of kerosene boiling range fractions and/or blends of such fractions with other components to form kerosene boiling range fuels, a variety of methods can be used. Density of a blend at 15° C. (kg/m³) can be determined according ASTM D4052. Sulfur (in wppm or wt %) can be determined according to ASTM D2622, while nitrogen (in wppm or wt %) can be determined according to D4629. Kinematic viscosity at either −20° C. or −40° C. (in cSt) can be determined according to ASTM D445. Pour point can be determined according to ASTM D5949. Cloud point can be determined according to D5773. Freeze point can be determined according to D7153. Boiling points and/or fractional distillation points can be determined according to ASTM D2887. If ASTM D2887 cannot be used for some reason, then ASTM D86 can be used. Flash point can be determined according to ASTM D93.

With regard to characterizing properties of diesel/distillate boiling range fractions and/or blends of such fractions with other components to form kerosene boiling range fuels, a variety of methods can be used. Density of a blend at 15° C. (kg/m$^3$) can be determined according ASTM D4052. Sulfur (in wppm or wt %) can be determined according to ASTM D2622, while nitrogen (in wppm or wt %) can be determined according to D4629. Pour point can be determined according to ASTM D5950. Cloud point can be determined according to D2500. Freeze point can be determined according to ASTM D5972. Cetane index can be determined according to ASTM D4737, procedure A. Cetane number can be determined according to ASTM D613. Derived cetane number can be determined according to ASTM D6890. Kinematic viscosity at 40° C. (in cSt) can be determined according to ASTM D445. Boiling points and/or fractional distillation points can be determined according to ASTM D2887. If ASTM D2887 cannot be used for some reason, then ASTM D86 can be used. Flash point can be determined according to ASTM D93. Cold filter plugging point can be determined according to ASTM D6371.

With regard to determining paraffin, naphthene, and aromatics contents, supercritical fluid chromatography (SFC) was used. The characterization was performed using a commercial supercritical fluid chromatograph system, and the methodology represents an expansion on the methodology described in ASTM D5186 to allow for separate characterization of paraffins and naphthenes. The expansion on the ASTM D5186 methodology was enabled by using additional separation columns, to allow for resolution of naphthenes and paraffins. The system was equipped with the following components: a high pressure pump for delivery of supercritical carbon dioxide mobile phase; temperature controlled column oven; auto-sampler with high pressure liquid injection valve for delivery of sample material into mobile phase; flame ionization detector; mobile phase splitter (low dead volume tee); back pressure regulator to keep the $CO_2$ in supercritical state; and a computer and data system for control of components and recording of data signal. For analysis, approximately 75 milligrams of sample was diluted in 2 milliliters of toluene and loaded in standard septum cap autosampler vials. The sample was introduced based via the high pressure sampling valve. The SFC separation was performed using multiple commercial silica packed columns (5 micron with either 60 or 30 angstrom pores) connected in series (250 mm in length either 2 mm or 4 mm ID). Column temperature was held typically at 35 or 40° C. For analysis, the head pressure of columns was typically 250 bar. Liquid $CO_2$ flow rates were typically 0.3 ml/minute for 2 mm ID columns or 2.0 ml/minute for 4 mm ID columns. The SFC FID signal was integrated into paraffin and naphthenic regions. In addition to characterizing aromatics according to ASTM D5186, a supercritical fluid chromatograph was used to analyze samples for split of total paraffins and total naphthenes. A variety of standards employing typical molecular types can be used to calibrate the paraffin/naphthene split for quantification.

In this discussion, the term "paraffin" refers to a saturated hydrocarbon chain. Thus, a paraffin is an alkane that does not include a ring structure. The paraffin may be straight-chain or branched-chain and is considered to be a non-ring compound. "Paraffin" is intended to embrace all structural isomeric forms of paraffins.

In this discussion, the term "naphthene" refers to a cycloalkane (also known as a cycloparaffin). Therefore, naphthenes correspond to saturated ring structures. The term naphthene encompasses single-ring naphthenes and multi-ring naphthenes. The multi-ring naphthenes may have two or more rings, e.g., two-rings, three-rings, four-rings, five-rings, six-rings, seven-rings, eight-rings, nine-rings, and ten-rings. The rings may be fused and/or bridged. The naphthene can also include various side chains, such as one or more alkyl side chains of 1-10 carbons.

In this discussion, the term "saturates" refers to all straight chain, branched, and cyclic paraffins. Thus, saturates correspond to a combination of paraffins and naphthenes.

In this discussion, the term "aromatic ring" means five or six atoms joined in a ring structure wherein (i) at least four of the atoms joined in the ring structure are carbon atoms and (ii) all of the carbon atoms joined in the ring structure are aromatic carbon atoms. Therefore, aromatic rings correspond to unsaturated ring structures. Aromatic carbons can be identified using, for example, $^{13}C$ Nuclear Magnetic Resonance. Aromatic rings having atoms attached to the ring (e.g., one or more heteroatoms, one or more carbon atoms, etc.) but which are not part of the ring structure are within the scope of the term "aromatic ring." Additionally, it is noted that ring structures that include one or more heteroatoms (such as sulfur, nitrogen, or oxygen) can correspond to an "aromatic ring" if the ring structure otherwise falls within the definition of an "aromatic ring".

In this discussion, the term "non-aromatic ring" means four or more carbon atoms joined in at least one ring structure wherein at least one of the four or more carbon atoms in the ring structure is not an aromatic carbon atom. Non-aromatic rings having atoms attached to the ring (e.g., one or more heteroatoms, one or more carbon atoms, etc.), but which are not part of the ring structure, are within the scope of the term "non-aromatic ring."

In this discussion, the term "aromatics" refers to all compounds that include at least one aromatic ring. Such compounds that include at least one aromatic ring include compounds that have one or more hydrocarbon substituents. It is noted that a compound including at least one aromatic ring and at least one non-aromatic ring falls within the definition of the term "aromatics".

It is noted that that some hydrocarbons present within a feed or product may fall outside of the definitions for paraffins, naphthenes, and aromatics. For example, any alkenes that are not part of an aromatic compound would fall outside of the above definitions. Similarly, non-aromatic compounds that include a heteroatom, such as sulfur, oxygen, or nitrogen, are not included in the definition of paraffins or naphthenes.

Feedstocks—Renewable Distillate

In various aspects, at least one of the feedstocks for co-processing can correspond to a feedstock containing renewable distillate that includes jet boiling range components. In some aspects, the feedstock can substantially correspond to a renewable fraction, so that 95 wt % or more of the feedstock corresponds to a renewable distillate. In other aspects, the renewable distillate can correspond to a portion of the feedstock containing the renewable distillate, so that 20 wt % to 95 wt % of the feedstock corresponds to renewable distillate. In such aspects, the balance of the feedstock can correspond to any convenient type of fraction, such as a mineral fraction, a Fischer-Tropsch fraction, or another distillate boiling range fraction. It is noted that in this discussion, at various locations, co-processing of a renewable distillate is described. Unless otherwise specified, it is understood that references to co-processing of a renewable distillate include co-processing of a feedstock that contains a renewable distillate portion.

In some aspects, a feedstock containing renewable distillate can correspond to a feedstock with a T10 distillation point of less than 285° C., such as down to 280° C. or possibly still lower. In some aspects, the fraction containing renewable distillate can have a T50 distillation point between 220° C. and 300° C. In some aspects, the fraction containing renewable distillate can correspond to a fraction containing renewable diesel, such as a fraction having a final boiling point of 300° C. or more and/or a T90 distillation point of 370° C. or less.

Because renewable distillate is derived from biological sources, the distribution of carbon numbers within a renewable distillate is different from a fraction derived from a mineral source. In particular, renewable distillate fractions can typically have substantially higher contents of components with even numbers of carbons relative to components with odd numbers of carbons.

A feedstock for production of a renewable distillate fuel, such as renewable distillate, can correspond to a feed derived from a biological source. In this discussion, a feed derived from a biological source refers to a feedstock derived from a biological raw material component, such as vegetable fats/oils or animal fats/oils, fish oils, pyrolysis oils, and algae lipds/oils, as well as components of such materials, and in some embodiments can specifically include one or more types of lipid compounds. Lipid compounds are typically biological compounds that are insoluble in water, but soluble in nonpolar (or fat) solvents. Non-limiting examples of such solvents include alcohols, ethers, chloroform, alkyl acetates, benzene, and combinations thereof.

Examples of vegetable oils that can be used in accordance with this invention include, but are not limited to rapeseed (canola) oil, soybean oil, coconut oil, sunflower oil, palm oil, palm kernel oil, peanut oil, linseed oil, tall oil, corn oil, castor oil, jatropha oil, jojoba oil, olive oil, flaxseed oil, camelina oil, safflower oil, babassu oil, tallow oil and rice bran oil.

Algae oils or lipids can typically be contained in algae in the form of membrane components, storage products, and/or metabolites. Certain algal strains, particularly microalgae such as diatoms and cyanobacteria, can contain proportionally high levels of lipids. Algal sources for the algae oils can contain varying amounts, e.g., from 2 wt % to 40 wt % of lipids, based on total weight of the biomass itself.

Vegetable fats/oils, animal fats/oils, fish oils, pyrolysis oils, and/or algae lipds/oils as referred to herein can also include processed material, such as palm oil mill effluent and/or other reconstituted triglycerides. Non-limiting examples of processed vegetable, animal (including fish), and algae material include fatty acids and fatty acid derivatives. Fatty acid derivatives can include, but are not limited to, fatty acid alkyl esters, such as fatty acid methyl esters (FAME); mono-, di-, and triglycerides; and other fatty acid derivatives that includes carbon chain length of 10 atoms to 20 atoms. Alkyl esters typically include $C_1$-$C_5$ alkyl esters of fatty acids.

A feed derived from a biological source can have a wide range of nitrogen and/or sulfur contents. For example, a feedstock based on a vegetable oil source can contain up to 300 wppm nitrogen. In contrast, a biomass based feedstream containing whole or ruptured algae can sometimes include a higher nitrogen content. Depending on the type of algae, the nitrogen content of an algae based feedstream can be at least 2 wt %, for example at least 3 wt %, at least 5 wt %, such as up to 10 wt % or possibly still higher. The sulfur content of a feed derived from a biological source can also vary. In some embodiments, the sulfur content can be 500 wppm or less, for example 100 wppm or less, or 50 wppm or less, such as down to being substantially free of sulfur (1.0 wppm or less).

Aside from nitrogen and sulfur, oxygen can be another heteroatom component in feeds derived from a biological source. For example, a feed derived from a biological source, prior to hydrotreatment, can include 1.0 wt % to 15 wt % of oxygen, or 1.0 wt % to 10 wt %, or 3.0 wt % to 15 wt %, or 3.0 wt % to 10 wt %, or 4.0 wt % to 15 wt %, or 4.0 wt % to 12 wt %.

Mineral Feedstocks

In various aspects, a renewable distillate feedstock and/or a feedstock including a renewable distillate component can be co-processed with at least one mineral feedstock. A mineral feedstock refers to a conventional feedstock, typically derived from crude oil and that has optionally been subjected to one or more separation and/or other refining processes. Examples of suitable feedstocks can include, but are not limited to, virgin distillates, hydrotreated virgin distillates, kerosene, diesel boiling range feeds (such as hydrotreated diesel boiling range feeds), light cycle oils, atmospheric gasoils, whole and reduced petroleum crudes, and mixtures of these materials.

It is noted that, in some aspects, the mineral feedstock can correspond to a mineral feedstock component. In such aspects, the mineral feedstock component can be part of a feed that includes up to 20 wt % of other types of components. Such other components can include, but are not limited to, Fischer-Tropsch components, other synthetically formed components, and/or renewable components. In this discussion, unless otherwise specified, it is understood that references to co-processing of a mineral feedstock include co-processing of a mineral feedstock component in a feed that includes up to 20 wt % of other types of components. In other aspects, the co-processing can be performed on a feedstock that substantially corresponds to a mineral feedstock, so that the mineral feedstock component is in a feedstock where the mineral feedstock component corresponds to 98.0 wt % or more of the feedstock, or 99.0 wt % or more, such as up to 100 wt %.

In order to perform co-processing, a renewable distillate feedstock (or feedstocks) can be blended with a mineral feedstock (or feedstocks) to form a combined feed. It is noted that the renewable distillate feedstock can correspond to a renewable component within a distillate boiling range feedstock. In some aspects, the amount of renewable distillate feedstock(s) can be characterized relative to the diesel boiling range portion of the mineral feedstock(s). In such aspects, in the combined feed, a ratio of the weight of the renewable distillate feedstock(s) to the weight of the diesel boiling range portion of the mineral feedstock(s) can be 0.01 to 5.0 (i.e., a weight ratio between 1:100 and 5.0:1). More generally, in the combined feed, a ratio of the weight of the renewable distillate feedstock(s) to the weight of the diesel boiling range portion of the mineral feedstock(s) can be 0.01 to 5.0, or 0.01 to 3.0, or 0.01 to 1.5, or 0.5 to 5.0, or 0.5 to 3.0, or 0.5 to 1.5, or 1.0 to 5.0, or 1.0 to 3.0. It is noted that some renewable distillate feedstocks can include a higher percentage of components boiling above 250° C. Thus, in order to form a jet boiling range product fraction containing a desirable amount of renewable content, it can be beneficial to incorporate a larger percentage of renewable distillate relative to the amount of diesel boiling range components in the mineral fraction.

In various aspects, the weight of the renewable distillate feedstock can correspond to 5.0 wt % to 70 wt % of the combined feed, or 5.0 wt % to 50 wt %, or 5.0 wt % to 30 wt %, or 5.0 wt % to 20 wt %, or 10 wt % to 70 wt %, or 10 wt % to 50 wt %, or 10 wt % to 30 wt %, or 30 wt % to 70 wt % or 30 wt % to 50 wt %. In some aspects, the mineral feedstock(s) can correspond to the balance of the feed.

In some aspects, in addition to a renewable distillate feedstock and a mineral feedstock, an additional co-feed can be included. Examples of such additional co-feeds can include, but are not limited to, fatty acids, fatty acid alkyl esters (such as fatty acid methyl ester), and Fischer-Tropsch liquids. Such additional co-feeds can correspond to 1.0 wt % to 30 wt % of the total feed.

Depending on the aspect, the diesel boiling range portion of the mineral feedstock(s) can be relatively free of nitrogen (such as a previously hydrotreated feedstock), or the mineral feedstock(s) can have a nitrogen content from 1 wppm to 2000 wppm nitrogen, for example from 50 wppm to 1500 wppm or from 75 to 1000 wppm. Additionally or alternately, the diesel boiling range portion of the mineral feedstock(s) can have a sulfur content from about 1 wppm to about 10,000 wppm sulfur, for example from about 10 wppm to about 5,000 wppm or from about 100 wppm to about 2,500 wppm.

The content of sulfur, nitrogen, oxygen, and olefins in a feedstock created by blending two or more feedstocks can typically be determined using a weighted average based on the blended feeds. For example, a mineral feed and a renewable feedstock can be blended in a ratio of 80 wt % mineral feedstock and 20 wt % renewable distillate feedstock. If the mineral feedstock has a sulfur content of 1000 wppm, and the renewable distillate feedstock has a sulfur content of 10 wppm, the resulting blended feed could be expected to have a sulfur content of 802 wppm.

Configuration Examples

After blending a feedstock including a renewable distillate component with a mineral feedstock (and/or mineral feedstock component) to form a combined feed, the combined feed can be co-processed by fractionating the combined feed to form at least a jet boiling range fraction and a diesel boiling range fraction. Optionally, at least a portion of the jet boiling range fraction can be exposed to further processing, such as hydroprocessing. Optionally, at least a portion of the diesel boiling range fraction can be exposed to further processing, such as hydroprocessing. Optionally, one or more other fractions formed by the fractionation can be exposed to further processing. For example, if one or more fractions heavier than a diesel fraction are formed, the one or more heavier fractions can be exposed to hydroprocessing conditions, fluid catalytic cracking conditions, or a combination thereof.

Figure 1:
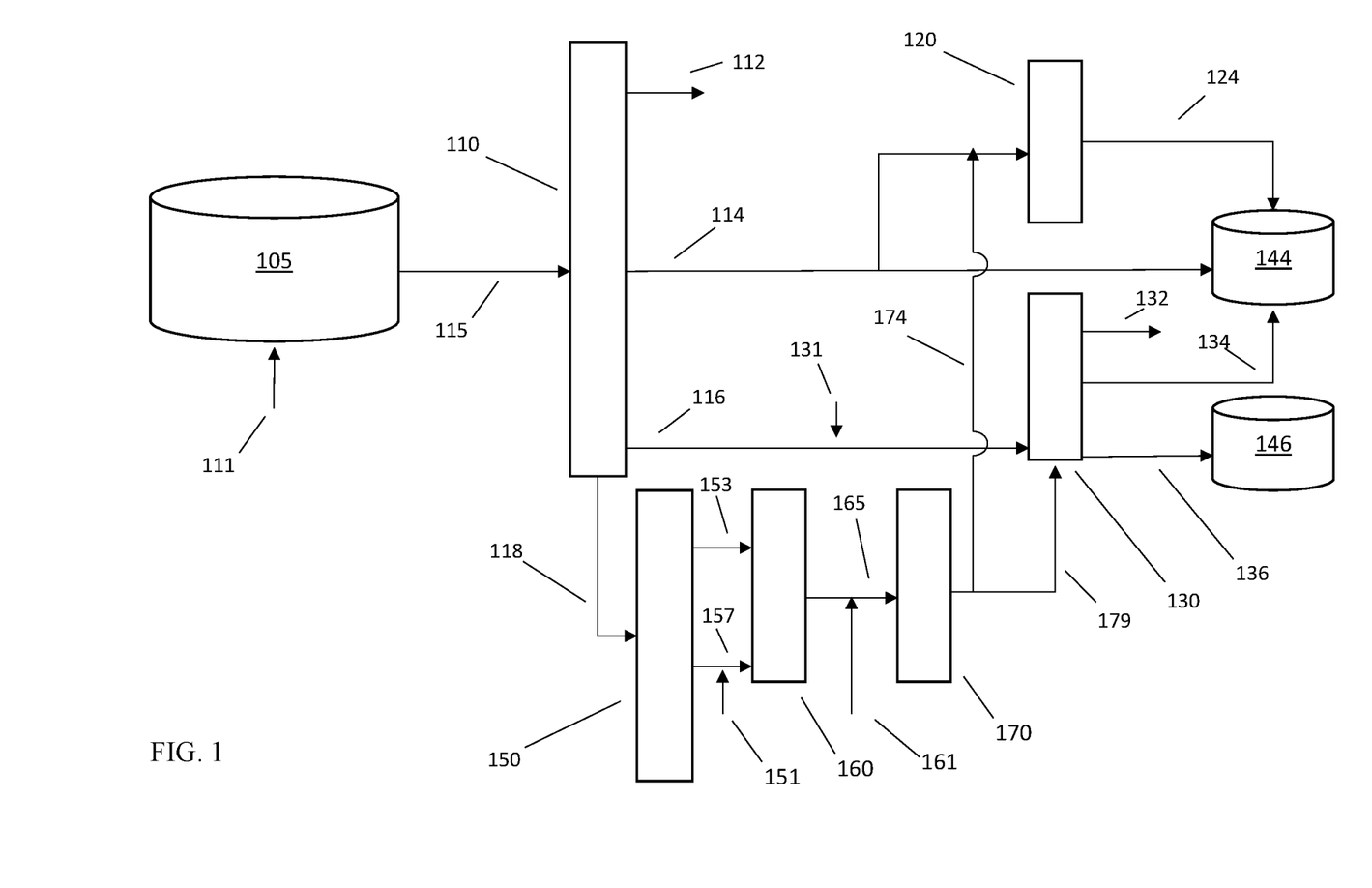
FIG. 1 shows an example of a configuration for forming a jet boiling range fraction and a diesel boiling range fraction by co-processing a renewable distillate feedstock and a mineral feedstock.

FIG. 1 shows an example of a process flow for co-processing of renewable distillate (such as a renewable distillate component) with a mineral feedstock (and/or a mineral feedstock component). In the example configuration shown in FIG. 1, one option for forming a combined feed is to mix renewable distillate 111 with the mineral feedstock a whole crude 105 (or another convenient wide boiling range fraction). The combined feed 115 can then be passed into a separation stage. In FIG. 1, the separation stage corresponds to a combination of an atmospheric distillation tower 120 and a vacuum distillation tower 150. In other aspects, any convenient set of processes can be used to form at least a jet boiling range fraction and a diesel boiling range fraction. In the example shown in FIG. 1, atmospheric distillation tower 120 is used to form at least a naphtha boiling range fraction 112, a jet boiling range fraction 114, a diesel boiling range fraction 116, and an atmospheric bottoms fraction 118.

Various options are available for jet boiling range fraction 114 and diesel boiling range fraction 116. In some aspects, at least a portion of jet boiling range fraction 114 can be passed directly into a jet boiling range product pool 144. Additionally or alternately, at least a portion of jet boiling range fraction 114 can be passed into kerosene hydroprocessing stage 120 to form a kerosene hydroprocessing effluent 124. kerosene hydroprocessing effluent 124 can then be passed into jet boiling range product pool 144. The hydroprocessing of the jet boiling range fraction 114 in kerosene hydroprocessing stage 120 can correspond to hydrotreatment, aromatic saturation, or another convenient type of hydroprocessing. Optionally, in addition to and/or in place of kerosene hydroprocessing stage 120, other forms of processing typically used in jet fuel processing can be used, such as clay treatment (not shown). In some aspects, at least a portion of diesel boiling range fraction 116 can be passed directly into a diesel boiling range product pool 146. Additionally or alternately, at least a portion of diesel boiling range fraction 116 can be passed into diesel hydroprocessing stage 130 to form a diesel hydroprocessing effluent. Optionally, when at least a portion of diesel boiling range fraction is passed into a diesel hydroprocessing stage 130, additional renewable distillate 131 can be added to the diesel boiling range fraction 116 prior to entering the hydroprocessing stage. At least a portion 136 of diesel hydroprocessing effluent can then be passed into diesel boiling range product pool 146. In some aspects, the diesel hydroprocessing effluent can also include a naphtha portion 132 and/or a jet portion 134. Jet portion 134 can optionally be added to jet boiling range product pool 144. The hydroprocessing 130 of the diesel boiling range fraction 116 can correspond to hydrotreatment, hydrocracking, catalytic dewaxing, aromatic saturation, or another convenient type of hydroprocessing. It is noted that, depending on the configuration, one or more of additional renewable distillate inputs 131, 151, and 161 can be present in a configuration, or two or more can be present.

The atmospheric bottoms fraction 118 can then be passed into vacuum distillation tower 150 to form one or more vacuum gas oil fractions. In the example shown in FIG. 1, a light vacuum gas oil 153 and a heavy vacuum gas oil fraction are formed, but any other convenient combination of vacuum gas oils (including a single vacuum gas oil fraction) can be formed. If components boiling above the vacuum gas oil range are present in the initial mineral feedstock 105, a vacuum resid fraction (not shown) can also be formed by vacuum distillation tower 150.

In the configuration shown in FIG. 1, the light vacuum gas oil 153 and heavy vacuum gas oil 157 can be passed into a hydrotreatment stage 160. Optionally, additional renewable distillate 151 can be combined with one or both of light vacuum gas oil 153 and heavy vacuum gas oil 157. In FIG. 1, renewable distillate 151 is shown as being combined with heavy vacuum gas oil 157. After hydrotreatment 160, the hydrotreated effluent 165 can be passed into a fluid catalytic cracking stage 170. Optionally, additional renewable distillate 161 can be added to hydrotreated effluent 165 prior to entering fluid catalytic cracking stage 170.

Fluid catalytic cracking stage 170 can generate several products. In the configuration shown in FIG. 1, fluid catalytic cracking stage 170 also represents separation stages for separating the resulting FCC products. The fluid catalytic cracking stage 170 can generate at least a catalytic naphtha (not shown), a jet boiling range fraction 174, and a light cycle oil 176. The jet boiling range fraction 174 can be combined with a portion of jet boiling range fraction 114 that is passed into hydroprocessing stage 120. The light cycle oil 176 can be combined with a portion of diesel boiling range fraction 116 that is passed into diesel hydroprocessing stage 130.

Figure 2:
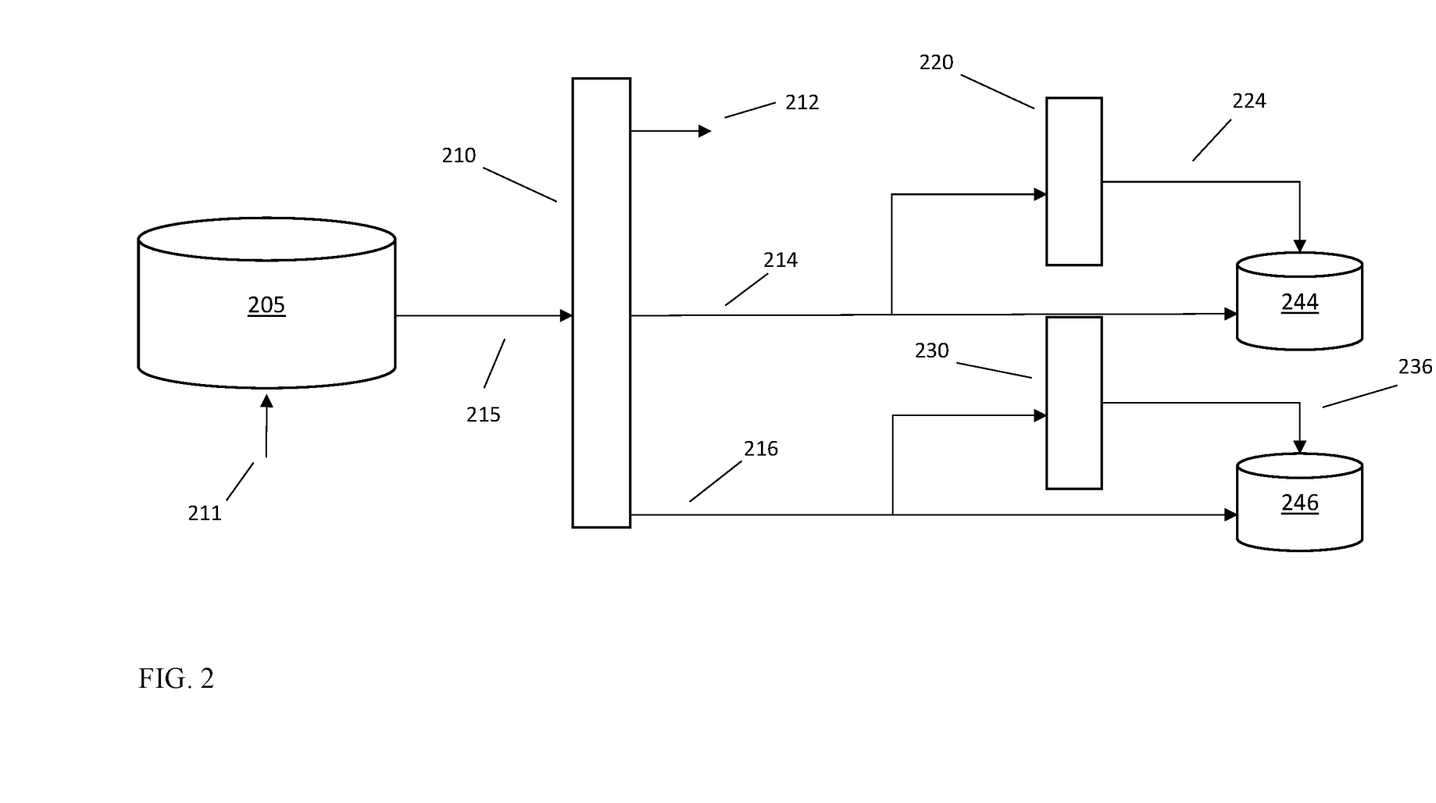
FIG. 2 shows another example of a configuration for forming a jet boiling range fraction and a diesel boiling range fraction by co-processing a renewable distillate feedstock and a mineral feedstock.

FIG. 2 shows another example of a configuration for co-processing of renewable distillate and a mineral feedstock. In the example configuration shown in FIG. 2, renewable distillate is only added when the combined feed is initially formed. In FIG. 2, the process flow shows just the configuration for processing diesel boiling range and lower components. However, to the degree that heavier components are present in the mineral feedstock, after initial separation, such heavier components can optionally be processed in any convenient manner, such as in the manner shown in FIG. 1.

In FIG. 2, renewable distillate 211 is mixed with a mineral feedstock 205 to form a combined feed 215. The combined feed 215 can then be passed into a separation stage 210. Separation stage 210 can correspond to any convenient number of separators for forming at least a jet boiling range fraction and a diesel boiling range fraction. In the configuration shown in FIG. 2, separation stage 210 can be used to separate combined feed 215 to form a naphtha boiling range fraction 212, a jet boiling range fraction 214, and a diesel boiling range fraction 216. Optionally, if mineral feedstock 205 includes atmospheric gas oil components, such as in aspects where mineral feedstock 205 corresponds to a whole or partial crude, additional higher boiling fractions can also be formed in separation stage 210.

Various options are available for jet boiling range fraction 214 and diesel boiling range fraction 216. In some aspects, at least a portion of jet boiling range fraction 214 can be passed directly into a jet boiling range product pool 244. Additionally or alternately, at least a portion of jet boiling range fraction 214 can optionally be passed into kerosene hydroprocessing stage 220 to form a kerosene hydroprocessing effluent 224. Kerosene hydroprocessing effluent 224 can then be passed into jet boiling range product pool 244. The hydroprocessing of the jet boiling range fraction 214 in kerosene hydroprocessing stage 220 can correspond to hydrotreatment, aromatic saturation, or another convenient type of hydroprocessing. Optionally, in addition to and/or in place of kerosene hydroprocessing stage 220, other forms of processing typically used in jet fuel processing can be used, such as clay treatment (not shown). In some aspects, at least a portion of diesel boiling range fraction 216 can be passed directly into a diesel boiling range product pool 246. Additionally or alternately, at least a portion of diesel boiling range fraction 216 can optionally be passed into diesel hydroprocessing stage 230 to form a diesel hydroprocessing effluent 236. At least a portion of diesel hydroprocessing effluent 236 can then be passed into diesel boiling range product pool 246. The hydroprocessing 230 of the diesel boiling range fraction 216 can correspond to hydrotreatment, hydrocracking, catalytic dewaxing, aromatic saturation, or another convenient type of hydroprocessing.

Figure 3:
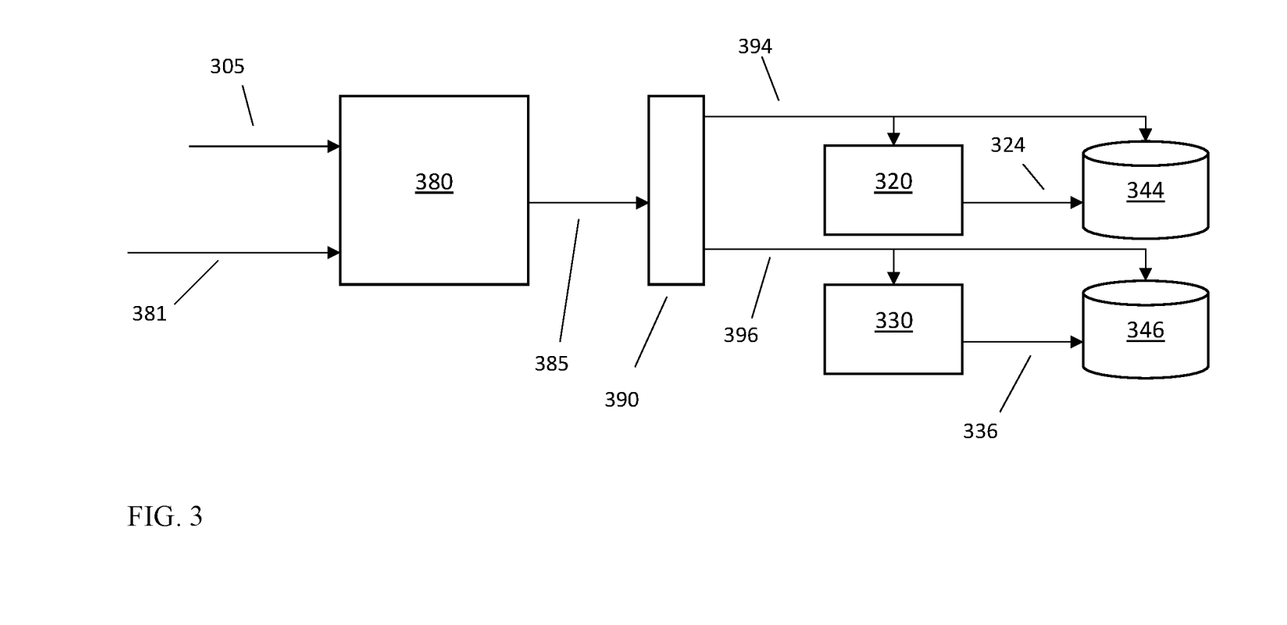
FIG. 3 shows another example of a configuration for forming a jet boiling range fraction and a diesel boiling range fraction by co-processing a renewable distillate feedstock and a mineral feedstock.

FIG. 3 shows still another potential configuration for co-processing of renewable distillate and a mineral feedstock. In the example shown in FIG. 3, the renewable distillate is co-processed with a distillate boiling range feedstock. In FIG. 3, renewable distillate 311 and distillate feedstock 305 are passed into a processing stage 380. Thus, in the configuration shown in FIG. 3, a combined feed is formed by passing the renewable distillate and the mineral fraction into a co-processing stage.

In FIG. 3, processing stage 380 can correspond to any convenient type of processing stage and/or combination of processing stages that is suitable for processing the distillate boiling range mineral feedstock. Thus, processing stage 380 can correspond to one or more of a hydrotreatment stage, a hydrocracking stage, a catalytic dewaxing stage, an aromatic saturation stage, or a fluid catalytic cracking stage. The resulting processed effluent 385 can then be passed into a separation stage 390 (such as a fractionator) to form at least a jet boiling range fraction 394 and a diesel boiling range fraction 396.

Various options are available for jet boiling range fraction 394 and diesel boiling range fraction 396. In some aspects, at least a portion of jet boiling range fraction 394 can be passed directly into a jet boiling range product pool 344. Additionally or alternately, at least a portion of jet boiling range fraction 394 can optionally be passed into kerosene hydroprocessing stage 320 to form a kerosene hydroprocessing effluent 324. Kerosene hydroprocessing effluent 324 can then be passed into jet boiling range product pool 344. The hydroprocessing of the jet boiling range fraction 314 in kerosene hydroprocessing stage 320 can correspond to hydrotreatment, aromatic saturation, or another convenient type of hydroprocessing. Optionally, in addition to and/or in place of kerosene hydroprocessing stage 320, other forms of processing typically used in jet fuel processing can be used, such as clay treatment (not shown). In some aspects, at least a portion of diesel boiling range fraction 396 can be passed directly into a diesel boiling range product pool 346. Additionally or alternately, at least a portion of diesel boiling range fraction 316 can optionally be passed into diesel hydroprocessing stage 330 to form a diesel hydroprocessing effluent 336. Optionally, when at least a portion of diesel boiling range fraction is passed into a diesel hydroprocessing stage 330, additional renewable distillate 331 can be added to the diesel boiling range fraction 316 prior to entering the hydroprocessing stage. At least a portion of diesel hydroprocessing effluent 336 can then be passed into diesel boiling range product pool 346. The hydroprocessing 330 of the diesel boiling range fraction 316 can correspond to hydrotreatment, hydrocracking, catalytic dewaxing, aromatic saturation, or another convenient type of hydroprocessing.

Co-Processing and Product Properties

After forming a combined feed including a renewable distillate feedstock and a mineral feedstock (and/or mineral feedstock component), the combined feed can be co-processed to form at least a jet boiling range product fraction and a diesel boiling range product fraction. In some aspects the co-processing can correspond to separation of the combined feed to form the respective product fractions. In other aspects, at least some additional processing (such as hydroprocessing) can be performed in order to form the jet boiling range product fraction and the diesel boiling range product fraction.

In some aspects, by co-processing a renewable distillate fraction and a mineral feedstock, a jet boiling range product fraction can be formed that includes an aromatics content of 3.0 wt % to 20 wt %, or 3.0 wt % to 15 wt %, or 3.0 wt % to 10 wt %, or 5.0 wt % to 20 wt %, or 5.0 wt % to 15 wt %. Additionally or alternately, in some aspects a jet boiling range product fraction can have a cetane index of 25-45, or 30-45, or 35-45, or 45-55. Further additionally or alternately, in some aspects a jet boiling range product fraction can have a sulfur content of 1000 wppm or less, or 500 wppm or less, or 250 wppm or less, or 100 wppm or less, such as down to 0.1 wppm or possibly still lower. Yet further additionally or alternately, a jet boiling range product fraction can have a weight ratio of aliphatic sulfur to total sulfur of 0.02 or more, or 0.1 or more, such as up to 0.7 or possibly still higher, thus corresponding to a jet boiling range product fraction that includes a substantial portion of a non-hydroprocessed mineral fraction; or a jet boiling range product fraction can have a weight ratio of aliphatic sulfur to total sulfur of 0.02 or less, or 0.01 or less, such as down to including substantially no aliphatic sulfur, thus corresponding to a jet boiling range product fraction that includes a substantial portion of a hydrotreated mineral fraction.

Still other properties of a jet boiling range product fraction can include a cloud point of −40° C. or lower, such as down to −60° C.; a pour point of −40° C. or lower, such as down to −60° C.; freeze point of −40° C. or lower, or −47° C. or lower (such as down to −60° C. or possibly still lower); and a smoke point of 22 mm or more.

Yet other properties of a jet boiling range product fraction can include a total acidity of 0.1 mg KOH/g or less, or 0.015 mg KOH/g or less, a sulfur content of 3000 wppm or less, a freezing point maximum of −40° C. or −47° C., a viscosity at −20° C. of 8.0 cSt or less, a flash point of at least 38° C., an initial boiling point of 140° C. or more, a T10 distillation point of 205° C. or less, and/or a final boiling point of 300° C. or less. Another example of a property specification is a specification for a maximum deposit thickness on the surface of a heater tube and/or a maximum pressure increase during a thermal stability test at 260° C. (according to ASTM D3241), such as a maximum deposit thickness of 85 nm and/or a maximum pressure increase of 25 mm Hg. Still another example of a property specification can be a water separation rating, such as a water separation rating of 85 or more, as measured according to ASTM D3948. A water separation rating provides an indication of the amount of surfactant present in a jet fuel boiling range sample. Petroleum fractions that have an appropriate boiling range and that also satisfy the various requirements for a commercial standard can be tested (such as according to ASTM D3241) and certified for use as jet fuels. In some aspects, the kerosene boiling range fraction can correspond to a jet fuel fraction that satisfies the specification for a jet fuel under ASTM D1655. This can include a thermal stability breakpoint of 260° C. or more, or 275° C. or more, as defined by ASTM D3241.

In some aspects, by co-processing a renewable distillate fraction and a mineral fraction, a diesel boiling range product fraction can be formed that includes a density at 15° C. of 800 kg/m$^3$ to 865 kg/m$^3$, or 800 kg/m$^3$ to 860 kg/m$^3$, or 800 kg/m$^3$ to 845 kg/m$^3$, or 800 kg/m$^3$ to 830 kg/m$^3$, or 810 kg/m$^3$ to 865 kg/m$^3$, or 810 kg/m$^3$ to 860 kg/m$^3$, or 810 kg/m$^3$ to 845 kg/m$^3$, or 810 kg/m$^3$ to 830 kg/m$^3$, or 820 kg/m$^3$ to 865 kg/m$^3$, or 820 kg/m$^3$ to 860 kg/m$^3$, or 820 kg/m$^3$ to 845 kg/m$^3$, or 820 kg/m$^3$ to 830 kg/m$^3$. Due to the high paraffin contents of renewable distillates, a renewable distillate can typically have a relatively low density relative to a mineral distillate fraction of similar boiling range. Conventionally, when forming a diesel fuel including a substantial portion of renewable distillate, this can result in the density of the diesel fuel falling below a density of 820 kg/m$^3$, which is a minimum density requirement in specifications such as EN590. In various aspects, by co-processing a renewable distillate and a mineral fraction to form a jet boiling range product fraction and a diesel boiling range product fraction, the resulting diesel boiling range product fraction can have a density of 820 kg/m$^3$ or higher, due in part to incorporation of lower boiling portions of the renewable distillate into the jet fuel boiling range product fraction. It is further noted that such a diesel boiling range product fraction can potentially be suitable for additional blending with fatty acid alkyl esters, such as a fatty acid methyl ester (FAME) fraction. FAME (and other fatty acid alkyl esters) can have a relatively high density, so that the amount of FAME that can be blended into a diesel fraction can be limited if it is desired to keep the density of the resulting diesel fuel below 845 kg/m$^3$. By forming a diesel boiling range fraction by co-processing a combined feed including 20 wt % or more of a renewable distillate, or 30 wt % or more, the resulting diesel boiling range product fraction can have a relatively low density. This can allow for blending of the diesel boiling range product fraction with a FAME fraction to form a combined product fraction with a FAME content of 10 wt % or more, or 15 wt % or more, such as up to 30 wt % or possibly still higher, while still maintaining a density of 865 kg/m$^3$, or 860 kg/m$^3$, or 845 kg/m$^3$ or less.

In some aspects, by co-processing a renewable distillate fraction and a mineral fraction, a diesel boiling range product fraction can be formed that includes a kinematic viscosity at 40° C. of 3.5 cSt or less, or 3.0 cSt or less, or 2.5 cSt or less, or 2.3 cSt or less, such as down to 1.5 cSt or possibly still lower. Additionally or alternately, in some aspects the diesel boiling range product fraction can have a kinematic viscosity at 40° C. of 2.0 cSt to 3.5 cSt, or 2.0 cSt to 3.0 cSt, or 2.2 cSt to 3.5 cSt. Conventionally, when forming a diesel fuel including a substantial portion of renewable distillate, this can result in the diesel fuel having a kinematic viscosity of less than 2.0 cSt. In various aspects, by co-processing a renewable distillate and a mineral fraction to form a jet boiling range product fraction and a diesel boiling range product fraction, the resulting diesel boiling range product fraction can have a kinematic viscosity at 40° C. of 2.0 cSt or higher, due in part to incorporation of lower boiling portions of the renewable distillate into the jet fuel boiling range product fraction.

In some aspects, by co-processing a renewable distillate fraction and a mineral fraction, a diesel boiling range product fraction can be formed that includes a T95 distillation point of 370° C. or less, or 360° C. or less, or 340° C. or less, or 330° C. or less, such as down to 280° C. or possibly still lower. Additionally or alternately, in some aspects, a diesel boiling range product fraction can be formed that has a T90 distillation point of 343° C. or less, or 330° C. or less, or 320° C. or less, or 310° C. or less, or 300° C. or less, such as down to 280° C. or possibly still lower. Additionally or alternately, in some aspects, a diesel boiling range product fraction can be formed that has a final boiling point of 300° C. or more, or 315° C. or more, or 330° C. or more, or 345° C. or more, or 360° C. or more, such as up to 390° C., or possibly still higher.

In some aspects, by co-processing a renewable distillate fraction and a mineral fraction, a diesel boiling range product fraction can be formed that includes a cetane index of 40 or more, or 45 or more, or 49 or more, or 54 or more, or 58 or more, such as up to 65 or possibly still higher.

In some aspects, by co-processing a renewable distillate fraction and a mineral fraction, a diesel boiling range product fraction can be formed that includes a pour point of −10° C. to −30° C. Additionally or alternately, a diesel boiling range product fraction can be formed that includes a cold filter plugging point (CFPP) of 5° C. to −35° C. Further additionally or alternately, a diesel boiling range product fraction can be formed that includes a cloud point of 0° C. to −30° C.

In some aspects, by co-processing a renewable distillate fraction and a mineral fraction, a diesel boiling range product fraction can be formed that includes an aromatics content of 3.0 wt % to 25 wt %, or 3.0 wt % to 20 wt %, or 3.0 wt % to 15 wt %, or 3.0 wt % to 10 wt %, or 5.0 wt % to 25 wt %, or 5.0 wt % to 20 wt %, or 5.0 wt % to 15 wt %.

In some aspects, a diesel boiling range product fraction can have a sulfur content of up to 2000 wppm, or potentially still higher. In some aspects, the sulfur content can be 50 wppm to 2000 wppm, or 50 wppm to 1000 wppm, or 50 wppm to 600 wppm, or 50 wppm to 400 wppm, or 200 wppm to 2000 wppm, or 200 wppm to 1000 wpp, or 200 wpm to 600 wppm, or 400 wppm to 2000 wppm. Additionally or alternately, a diesel boiling range product fraction can have a ratio of aliphatic sulfur can have a weight ratio of aliphatic sulfur to total sulfur of 0.1 or more, or 0.2 or more, such as up to 0.7 or possibly still higher, thus corresponding to a diesel boiling range product fraction that includes a substantial portion of a non-hydroprocessed mineral fraction; or a diesel boiling range product fraction can have a weight ratio of aliphatic sulfur to total sulfur of 0.05 or less, such as down to including substantially no aliphatic sulfur, thus corresponding to a diesel boiling range product fraction that includes a substantial portion of a hydrotreated mineral fraction.

Additional Processing of Fractions

In some aspects, one or more types of additional processing can be used to further process fractions derived from the combined feed. Such additional processing can include, but is not limited to, hydrotreatment, hydrocracking, catalytic dewaxing and/or hydorisomerization, aromatic saturation, and fluid catalytic cracking.

Hydroprocessing (such as hydrotreating) can be carried out in the presence of hydrogen. A hydrogen stream can be fed or injected into a vessel or reaction zone or hydroprocessing zone corresponding to the location of a hydroprocessing catalyst. Hydrogen, contained in a hydrogen "treat gas," can be provided to the reaction zone. Treat gas, as referred to herein, can be either pure hydrogen or a hydrogen-containing gas stream containing hydrogen in an amount that for the intended reaction(s). Treat gas can optionally include one or more other gasses (e.g., nitrogen and light hydrocarbons such as methane) that do not adversely interfere with or affect either the reactions or the products. Impurities, such as $H_2S$ and $NH_3$ are undesirable and can typically be removed from the treat gas before conducting the treat gas to the reactor. In aspects where the treat gas stream can differ from a stream that substantially consists of hydrogen (i.e., at least 99 vol % hydrogen), the treat gas stream introduced into a reaction stage can contain at least 50 vol %, or at least 75 vol % hydrogen, or at least 90 vol % hydrogen.

During hydrotreatment, a feedstock can be contacted with a hydrotreating catalyst under effective hydrotreating conditions which can include temperatures in the range of 450° F. to 800° F. (~232° C. to ~427° C.), or 550° F. to 750° F. (~288° C. to ~399° C.); pressures in the range of 1.5 MPag to 20.8 MPag (~200 to ~3000 psig), or 2.9 MPag to 13.9 MPag (~400 to ~2000 psig); a liquid hourly space velocity (LHSV) of from 0.1 to 10 $hr^{-1}$, or 0.1 to 5 $hr^{-1}$; and a hydrogen treat gas rate of from 430 to 2600 $Nm^3/m^3$ (~2500 to 15000 SCF/bbl), or 850 to 1700 $Nm^3/m^3$ (~5000 to ~10000 SCF/bbl).

In some aspects, a hydroprocessed diesel boiling range product fraction can have a sulfur content of less than 500 wppm, or potentially lower. In some aspects, the sulfur content can be 1 wppm to 500 wppm, or 2 wppm to 100 wppm, or 5 wppm to 50 wppm, or 9 wppm to 15 wppm, or 1 wppm to 5 wppm, or 1 wppm to 10 wppm, or 1 wppm to 15 wppm.

During hydrocracking, a feedstock can be contacted with a hydrocracking catalyst under effective hydrocracking conditions which can include temperatures of 550° F. (288° C.) to 840° F. (449° C.), hydrogen partial pressures of from 250 psig to 5000 psig (1.8 MPag to 34.6 MPag), liquid hourly space velocities of from 0.05 $h^{-1}$ to 10 $h^{-1}$, and hydrogen treat gas rates of from 35.6 $m^3/m^3$ to 1781 $m^3/m^3$ (200 SCF/B to 10,000 SCF/B).

Process conditions in a catalytic dewaxing zone (in the presence of a dewaxing catalyst) can include a temperature of from 200 to 450° C., preferably 270 to 400° C., a hydrogen partial pressure of from 1.8 MPag to 34.6 MPag (250 psig to 5000 psig), preferably 4.8 MPag to 20.7 MPag, and a hydrogen treat gas rate of from 35.6 $m^3/m^3$ (200 SCF/B) to 1781 $m^3/m^3$ (10,000 scf/B), preferably 178 $m^3/m^3$ (1000 SCF/B) to 890.6 $m^3/m^3$ (5000 SCF/B). The liquid hourly space velocity (LHSV) can be from 0.2 $h^{-1}$ to 10 $h^{-1}$, such as from 0.5 $h^{-1}$ to 5 $h^{-1}$ and/or from 1 $h^{-1}$ to 4 $h^{-1}$.

Aromatic saturation conditions can include temperatures from 125° C. to 425° C., preferably 180° C. to 280° C., a hydrogen partial pressure from 500 psig (3.4 MPa) to 3000 psig (20.7 MPa), preferably 1500 psig (10.3 MPa) to 2500 psig (17.2 MPa), and liquid hourly space velocity from 0.1 $hr^{-1}$ to 5 LHSV, preferably 0.5 $hr^{-1}$ to 2.0 $hr^{-1}$.

An example of a suitable reactor for performing an FCC process can be a riser reactor. Within the reactor riser, a feed can be contacted with a catalytic cracking catalyst under cracking conditions thereby resulting in spent catalyst particles containing carbon deposited thereon and a lower boiling product stream. The cracking conditions can include: temperatures from 900° F. to 1060° F. (~482° C. to ~571° C.), or 950° F. to 1040° F. (~510° C. to ~560° C.); hydrocarbon partial pressures from 10 to 50 psia (~70-350 kPa-a), or from 20 to 40 psia (~140-280 kPa-a); and a catalyst to feed (wt/wt) ratio from 3 to 8, or 5 to 6, where the catalyst weight can correspond to total weight of the catalyst composite. Steam may be concurrently introduced with the feed into the reaction zone. The steam may comprise up to 5 wt % of the feed. In some aspects, the FCC feed residence time in the reaction zone can be less than 5 seconds, or from 3 to 5 seconds, or from 2 to 3 seconds.

Additional Embodiments

Embodiment 1. A method for forming a jet boiling range composition and a diesel boiling range composition, comprising: blending a distillate boiling range feedstock comprising a renewable distillate component and a mineral feedstock component to form a combined feedstock, the combined feedstock comprising a weight ratio of the distillate boiling range feedstock comprising the renewable distillate component to a diesel boiling range portion of the mineral feedstock component of 0.01 to 5.0, the distillate boiling range feedstock comprising the renewable distillate component comprising 10 wt % or more of components boiling at 285° C. or lower; and co-processing the combined feed to form at least a jet boiling range composition and a diesel boiling range composition, the jet boiling range composition comprising a flash point of 38° C. or more, a T10 distillation point of 205° C. or less, and a final boiling point of 285° C. or less, the diesel boiling range composition comprising a final boiling point of 300° C. or more and a T90 distillation point of 370° C. or less.

Embodiment 2. The method of Embodiment 1, wherein the distillate boiling range feedstock comprising a renewable distillate component comprises a T10 distillation point of 280° C. or less.

Embodiment 3. The method of any of the above embodiments, wherein the jet boiling range composition comprises an aromatics content of 3.0 wt % to 15 wt %, or 3.0 wt % to 10 wt %, or 5.0 wt % to 15 wt %; or wherein the jet boiling range composition comprises a cetane index of 25 or more, or 25-60, 25-45, or 30-45, or 35-45; or wherein the jet boiling range composition comprises a specific energy of 42.8 MJ/kg or more; or a combination of two or more thereof.

Embodiment 4. The method of any of the above claims, wherein the jet boiling range composition comprises a weight ratio of aliphatic sulfur to total sulfur of 0.02 or more.

Embodiment 5. The method of any of the above claims, wherein the diesel boiling range composition comprises a density of 800 kg/m$^3$ or more; or wherein the diesel boiling range composition comprises an aromatics content of 20 wt % or less; or wherein the diesel boiling range composition comprises a kinematic viscosity at 40° C. of 2.0 cSt or more and/or 3.5 cSt or less; or wherein the diesel boiling range composition comprises a sulfur content of 50 wppm to 2000 wppm; or a combination of two or more thereof; or a combination of three or more thereof.

Embodiment 6. The method of any of the above claims, wherein the co-processing comprises separating the combined feed to form a jet boiling range fraction and a diesel boiling range fraction, the jet boiling range composition optionally comprising at least a portion of the jet boiling range fraction, or the jet boiling range composition optionally consisting of the jet boiling range fraction.

Embodiment 7. The method of Embodiment 6, wherein the co-processing further comprises hydroprocessing at least a portion of the jet boiling range fraction to form a jet hydroprocessing effluent, the jet boiling range composition comprising at least a portion of the jet hydroprocessing effluent.

Embodiment 8. The method of Embodiment 6 or 7, wherein the co-processing further comprises hydroprocessing at least a portion of the diesel boiling range fraction to form a diesel hydroprocessing effluent, the diesel boiling range composition comprising at least a portion of the diesel hydroprocessing effluent, the jet boiling range composition optionally further comprising at least a portion of the diesel hydroprocessing effluent.

Embodiment 9. The method of Embodiment 8, further comprising combining the at least a portion of the diesel boiling range fraction with a second renewable distillate feedstock portion, the hydroprocessing of the at least a portion of the diesel boiling range fraction further comprising hydroprocessing the second renewable distillate feedstock portion.

Embodiment 10. The method of any of Embodiments 6-9, wherein separating the combined feed further comprises forming at least one additional distillate boiling range fraction, wherein the co-processing further comprises the at least one additional distillate boiling range fraction to hydroprocessing conditions, fluid catalytic cracking conditions, or a combination thereof to form an additional distillate processing effluent, and wherein hydroprocessing at least a portion of the jet boiling range fraction comprises hydroprocessing at least a portion of the additional distillate processing effluent.

Embodiment 11. The method of any of the above embodiments, wherein the distillate boiling range feedstock comprises 95 wt % or more of the renewable distillate component; or wherein blending the distillate boiling range feedstock comprising a renewable distillate component and the mineral feedstock component comprises blending the distillate boiling range feedstock comprising a renewable distillate component with a feedstock comprising 98.0 wt % or more of the mineral feedstock component relative to a weight of the feedstock; or a combination thereof.

Embodiment 12. The method of any of the above embodiments, wherein the renewable distillate component comprises renewable diesel in accordance with ASTM D975, or wherein the renewable distillate component comprises paraffinic diesel in accordance with EN 15940, or a combination thereof.

Embodiment 13. The method of any of Embodiments 1-12, wherein the renewable distillate component comprises hydroprocessed biomass but does not contain renewable diesel, or wherein the renewable distillate component comprises hydroprocessed biomass but does not contain paraffinic diesel, or a combination thereof.

Embodiment 14. A jet boiling range composition formed according to the method of any of Embodiments 1-13.

Embodiment 15. A diesel boiling range composition formed according to the method of any of Embodiments 1-13.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

What is claimed is:

1. A method for forming a jet boiling range composition and a diesel boiling range composition, comprising:
   blending a distillate boiling range feedstock comprising a renewable distillate component and a mineral feedstock component to form a combined feedstock, the distillate boiling range feedstock comprising 95 wt % or more of the renewable distillate component, the combined feedstock comprising a weight ratio of the distillate boiling range feedstock comprising the renewable distillate component to a diesel boiling range portion of the mineral feedstock component of 0.1 to 5.0, the distillate boiling range feedstock comprising the renewable distillate component comprising 10 wt % or more of components boiling at 285° C. or lower; and
   separating the combined feed to form at least a jet boiling range composition and a diesel boiling range composition, the jet boiling range composition comprising a flash point of 38° C. or more, an aromatics content of 3.0 wt % to 15 wt %, a T10 distillation point of 205° C. or less, and a final boiling point of 285° C. or less, the diesel boiling range composition comprising a sulfur content of 50 wppm to 2000 wppm, a final boiling point of 300° C. or more and a T95 distillation point of 370° C. or less.

2. The method of claim 1, wherein the distillate boiling range feedstock comprising a renewable distillate component comprises a T10 distillation point of 280° C. or less.

3. The method of claim 1, wherein the jet boiling range composition comprises a cetane index of 25 or more, or wherein the jet boiling range composition comprises a specific energy of 42.8 MJ/kg or more, or a combination thereof.

4. The method of claim 1, wherein the jet boiling range composition comprises a weight ratio of aliphatic sulfur to total sulfur of 0.02 or more.

5. The method of claim 1, wherein the diesel boiling range composition comprises a density of 800 kg/m3 or more; or wherein the diesel boiling range composition comprises an aromatics content of 20 wt % or less; or wherein the diesel boiling range composition comprises a kinematic viscosity at 40° C. of 2.0 cSt or more; or wherein the diesel boiling range composition comprises a kinematic viscosity at 40° C. of 3.5 cSt or less; or a combination of two or more thereof; or a combination of three or more thereof.

6. The method of claim 1, wherein the renewable distillate component comprises renewable diesel in accordance with ASTM D975, or wherein the renewable distillate component comprises paraffinic diesel in accordance with EN 15940, or a combination thereof.

7. The method of claim 1, wherein the renewable distillate component comprises hydroprocessed biomass but does not contain renewable diesel, or wherein the renewable distillate component comprises hydroprocessed biomass but does not contain paraffinic diesel, or a combination thereof.

8. The method of claim 1, wherein blending the distillate boiling range feedstock comprising a renewable distillate component and the mineral feedstock component comprises blending the distillate boiling range feedstock comprising a renewable distillate component with a feedstock comprising 98.0 wt % or more of the mineral feedstock component relative to a weight of the feedstock.

9. A method for forming a jet boiling range composition and a diesel boiling range composition, comprising:

blending a distillate boiling range feedstock comprising a renewable distillate component and a mineral feedstock component to form a combined feedstock, the combined feedstock comprising a weight ratio of the distillate boiling range feedstock comprising the renewable distillate component to a diesel boiling range portion of the mineral feedstock component of 0.1 to 5.0, the distillate boiling range feedstock comprising the renewable distillate component comprising 10 wt % or more of components boiling at 285° C. or lower;

separating the combined feed to form at least a jet boiling range fraction and a diesel boiling range fraction; and hydroprocessing at least a portion of the jet boiling range fraction to form a first hydroprocessing effluent, the jet boiling range composition comprising a portion of the first hydroprocessing effluent, the jet boiling range composition comprising a flash point of 38° C. or more, an aromatics content of 3.0 wt % to 15 wt %, a T10 distillation point of 205° C. or less, and a final boiling point of 285° C. or less, the diesel boiling range composition comprising a final boiling point of 300° C. or more and a T95 distillation point of 370° C. or less.

10. The method of claim 9, wherein the co-processing further comprises hydroprocessing at least a portion of the diesel boiling range fraction to form a diesel hydroprocessing effluent, the diesel boiling range composition comprising at least a portion of the diesel hydroprocessing effluent.

11. The method of claim 10, further comprising combining the at least a portion of the diesel boiling range fraction with a second renewable distillate feedstock portion, the hydroprocessing of the at least a portion of the diesel boiling range fraction further comprising hydroprocessing the second renewable distillate feedstock portion.

12. The method of claim 9, wherein the distillate boiling range feedstock comprises 95 wt % or more of the renewable distillate component.

13. The method of claim 10, wherein the jet boiling range composition further comprises at least a portion of the diesel hydroprocessing effluent.

* * * * *